United States Patent
Matsuo et al.

(10) Patent No.: US 9,689,730 B2
(45) Date of Patent: Jun. 27, 2017

(54) ESTIMATION APPARATUS OF HEAT TRANSFER MEDIUM FLOW RATE, HEAT SOURCE MACHINE, AND ESTIMATION METHOD OF HEAT TRANSFER MEDIUM FLOW RATE

(75) Inventors: Minoru Matsuo, Tokyo (JP); Kenji Ueda, Tokyo (JP); Toshihiko Niinomi, Tokyo (JP); Hitoi Ono, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1035 days.

(21) Appl. No.: 13/885,944

(22) PCT Filed: Feb. 16, 2012

(86) PCT No.: PCT/JP2012/053625
§ 371 (c)(1),
(2), (4) Date: May 16, 2013

(87) PCT Pub. No.: WO2012/132605
PCT Pub. Date: Oct. 4, 2012

(65) Prior Publication Data
US 2013/0238258 A1  Sep. 12, 2013

(30) Foreign Application Priority Data
Mar. 31, 2011  (JP) .................. 2011-081186

(51) Int. Cl.
*G01F 3/00* (2006.01)
*F25B 41/04* (2006.01)
*F25B 49/02* (2006.01)

(52) U.S. Cl.
CPC ................ *G01F 3/00* (2013.01); *F25B 41/04* (2013.01); *F25B 49/025* (2013.01);
(Continued)

(58) Field of Classification Search
CPC ..... G01F 3/00; F25B 2600/02; F25B 2600/21; F25B 2700/135; F25B 41/04;
(Continued)

(56) References Cited

U.S. PATENT DOCUMENTS

| | | | |
|---|---|---|---|
| 2002/0035841 A1* | 3/2002 | Flynn ..................... | C09K 5/045 62/217 |
| 2005/0144965 A1 | 7/2005 | Ueda et al. | |

(Continued)

FOREIGN PATENT DOCUMENTS

| | | |
|---|---|---|
| CN | 1128340 A | 8/1996 |
| CN | 1409077 A | 4/2003 |

(Continued)

OTHER PUBLICATIONS

Chinese Notice of Allowance dated Dec. 3, 2014, issued in corresponding Chinese Patent Application No. 201280003294.2, (2 pages). Concise statement of relevance: The Notice of Allowance has been received.

(Continued)

*Primary Examiner* — Mark Crohn
(74) *Attorney, Agent, or Firm* — Westerman, Hattori, Daniels & Adrian, LLP (57) ABSTRACT

A required-circulated-refrigerant flow-rate calculating portion provided in a chilled-water flow-rate estimation calculation portion calculates an evaporator exchanged heat quantity exchanged between a refrigerant and chilled water at an evaporator based on a planned chilled-water-flow-rate value and a measured value of the temperature of the chilled water flowing in the evaporator, and calculates an evaporator-refrigerant flow rate based on that evaporator exchanged heat quantity. Then, a circulated-chilled-water flow-rate back-calculating portion back-calculates an evaporator-refrigerant flow rate based on the calculated evaporator- (Continued)

refrigerant flow rate and a ratio between a set value of differential pressure between a condenser and the evaporator and a measured value of that differential pressure, back-calculates an evaporator exchanged heat quantity exchanged between the refrigerant and the chilled water at the evaporator from the back-calculated evaporator-refrigerant flow rate, and back-calculates the flow rate of the chilled water.

6 Claims, 6 Drawing Sheets

(52) U.S. Cl.
CPC ... *F25B 2400/13* (2013.01); *F25B 2600/2509* (2013.01); *F25B 2600/2513* (2013.01)

(58) Field of Classification Search
CPC ............... F25B 49/025; F25B 2400/13; F25B 2600/2509; F25B 2600/2513
USPC .......................................... 62/125, 127, 129
See application file for complete search history.

(56) References Cited

U.S. PATENT DOCUMENTS

| | | | | |
|---|---|---|---|---|
| 2009/0151356 | A1* | 6/2009 | Ast | F01K 23/101 60/660 |
| 2010/0198416 | A1* | 8/2010 | Kasahara | F25B 13/00 700/282 |

FOREIGN PATENT DOCUMENTS

| | | |
|---|---|---|
| JP | 64-28456 A | 1/1989 |
| JP | 07-091764 A | 4/1995 |
| JP | 3083929 B2 | 9/2000 |
| JP | 3253190 B | 11/2001 |
| JP | 2005-155973 A | 6/2005 |
| JP | 2005-180267 A | 7/2005 |
| JP | 2007-225140 A | 9/2007 |
| JP | 2008-39230 A | 2/2008 |
| JP | 4385738 B | 10/2009 |

OTHER PUBLICATIONS

Japanese Decision to Grant a Patent dated Apr. 30, 2014, issued in corresponding Japanese Patent Application No. 2011-081186 (3 pages), "The Decision to Grant a Patent has been received".
Korean Decision to Grant a Patent has been received dated Jul. 8, 2014, issued in corresponding Korean Patent Application No. 10-2013-7009679, w/English explanation of relevance (3 pages).
Chinese Office Action dated Aug. 20, 2014, issued in corresponding CN application No. 201280003294.2 with English translation (8 pages).
International Search Report for PCT/JP2012/053625, Mailing Date of Apr. 17, 2012.
Written Opinion for PCT/JP2012/053625, Mailing Date of Apr. 17, 2012.

* cited by examiner

ESTIMATION APPARATUS OF HEAT TRANSFER MEDIUM FLOW RATE, HEAT SOURCE MACHINE, AND ESTIMATION METHOD OF HEAT TRANSFER MEDIUM FLOW RATE

TECHNICAL FIELD

The present invention relates to an estimation apparatus of heat transfer medium flow rate, a heat source machine, and an estimation method of heat transfer medium flow rate.

BACKGROUND ART

To operate a heat source machine, for example, a chiller on the design value, it is necessary to manage a flow rate of a heat transfer medium (chilled water) flowing into an evaporator, but a flow meter for measuring the flow rate of the heat transfer medium may not be provided in the chiller because a flow meter for measuring a flow rate is expensive, and it is required to reduce the number of components and so on.

In a chiller that is not provided with a flow meter for measuring the flow rate of a heat transfer medium, for example, the flow rate of the heat transfer medium to be used in computation for controlling the degree-of-opening of an expansion valve diverges from the actual flow rate of the heat transfer medium, and problems such as those described below may occur due to the deviation between the degree-of-opening of the expansion valve calculated by the computation and the actually required degree-of-opening of the expansion valve.

If the degree-of-opening of the expansion valve is excessive, the flow rate of the refrigerant becomes excessive, and thus, it is possible that the coefficient of performance (COP (coefficient of performance)) of a chiller deteriorates as a result of the motor power input of the chiller becoming excessive, that so-called refrigerant flood back occurs, where the compressor draws in liquid-phase refrigerant, and that gas bypass occurs, where a portion of the refrigerant flows into an evaporator in the gas phase without being turned into the liquid phase in a condenser due to insufficient subcooling at the condenser.

On the other hand, if the degree-of-opening of the expansion valve is too small, the pressure difference between the condenser and the evaporator becomes excessive, and thus, it is possible that, the COP deteriorates as a result of the motor power input of the chiller becoming excessive.

Therefore, as the technologies for measuring a flow rate, PTL 1 discloses the estimation system of cooling water flow rate in that a chilling load is computed based on measurement values of an outlet, temperature of chilled water, an inlet temperature of the chilled water and a flow rate of the chilled water, a heat exchange coefficient is computed based on the inlet temper at lire of the chilled water and the chilling load, and a flow rate of a cooling water is derived from measurement values sent front, a group of sensors and the heat exchange coefficient, and then output it.

PTL 2 describes the technology in that, for a plurality of air conditioning machines, a plurality of differential pressure sensors are provided to measure a differential pressure between an inlet and an outlet of chilled and heated water in each of the plurality of air conditioning machines and a flow sensor is provided to measure the entire flow rate of the chilled and heated water, and by providing a flow path allowing only one differential pressure sensor to operate through valve switching and the like, the relation between the flow rate and the differential pressure is obtained before operation of cooling, and on the operation of cooling, a flow rate of the chilled and heated water is obtained using the differential pressure sensors.

CITATION LIST

Patent Literature

{PTL 1} Japanese Unexamined Patent Application, Publication No. Hei 7-91764
{PTL 2} Japanese Unexamined Patent Application, Publication No. 2005-155973

SUMMARY OF INVENTION

Technical Problem

However, according to the technology described in PTL 1, the flow meter for measuring the flow rate of the chilled water is used to compute the flow rate of the cooling water. According to the technology described in PTL 2, to measure the flow rate of the chilled and heated water in each of air-conditioning machines, the flow sensor for measuring the flow rate of all the chilled and heated water and the plurality of differential pressure sensors is used.

As described above, according to the technologies described in PTL 1 and PTL 2, because to compute a flow rate of a predetermined fluid, the flow meter for measuring a flow rate of the other fluid and the differential pressure gauge for measuring a differential pressure of the other fluid are used, the flow rate of the fluid cannot be figured out at low cost.

Therefore, the present invention has been made in view of the situations described above, and its object is to provide an estimation apparatus of heat transfer medium flow rate capable of computing a flow rate of a heat transfer medium without using a flow meter, a heat source machine, and an estimation method of heat transfer medium flow rate.

Solution to Problem

To solve the problem described above, an estimation apparatus of heat transfer medium flow rate, a heat source machine and an estimation method of heat transfer medium flow rate employ the following solutions.

That is, the estimation apparatus of heat transfer medium flow rate according to one aspect of the present invention is an estimation apparatus of heat transfer medium flow rate for estimating a flow rate of a heat transfer medium in the heat source machine including a compressor for compressing a refrigerant, a condenser for condensing the compressed refrigerant using a heat source medium, an evaporator for evaporating the condensed refrigerant and carrying out heat exchange between the refrigerant and a heat transfer medium, and an expansion valve that allows liquid-phase refrigerant retained in the condenser to expand, the heat transfer medium flow rate estimating device including a refrigerant-flow-rate calculating portion that calculates a heat quantity exchanged between the refrigerant and the heat, transfer medium at the evaporator based on a planned value of the flow rate of the heat, transfer medium and a measured value of the temperature of the heat transfer medium flowing in the evaporator, and that calculates the flow rate of the refrigerant flowing in the evaporator from that heat quantity; and a heat-transfer-medium-flow-rate back-calculating portion that back-calculates the flow rate of the refrigerant flowing in the evaporator based on the flow rate of the refrigerant calculated by the refrigerant-flow-rate calculating portion and a ratio between a set value of the differential pressure between the condenser and the evaporator and a measured value of that differential pressure, that back-calculates a heat quantity exchanged between the refrigerant and the heat transfer medium at the evaporator from the back-calculated flow rate of the refrigerant, and that, back-calculates the flow rate of the heat transfer medium based on the back-calculated heat quantity and the measured value of the temperature of the heat transfer medium flowing in the evaporator.

With the above-described first aspect, the heat transfer medium flow rate estimating device is a device that estimates the flow rate of the heat transfer medium in the heat-source unit provided with the compressor that compresses the refrigerant, the condenser that condenses the compressed refrigerant by means of the heat-source medium, and the evaporator that evaporates the condensed refrigerant and also performs heat exchange between this refrigerant and the heat transfer medium.

With the refrigerant-flow-rate calculating portion provided in the heat transfer medium flow rate estimating device, the heat quantity exchanged between the refrigerant and the heat transfer medium at the evaporator is calculated based on the planned value of the flow rate of the heat, transfer medium and the measured value of the temperature of the heat transfer medium flowing in the evaporator, and the flow rate of the refrigerant flowing in the evaporator is calculated from that, heat quantity.

Note that the flow rate of the refrigerant calculated by the refrigerant-flow-rate calculating portion is used to calculate a command value for controlling the degree-of-opening of the expansion valve.

Then, the heat-transfer-medium-flow-rate back-calculating portion back-calculates the flow rate of the refrigerant flowing in the evaporator based on the flow rate of the refrigerant calculated by the refrigerant-flow-rate calculating portion and the ratio between a set value of the differential pressure between the condenser and the evaporator and the measured value of that differential pressure.

Furthermore, the heat-transfer-medium-flow-rate back-calculating portion back-calculates the heat quantity exchanged between the refrigerant and the heat transfer medium at the evaporator based on the back-calculated flow rate of the refrigerant described above, and back-calculates the flow rate of the heat transfer medium based on the back-calculated heat quantity and the measured value of the temperature of the heat transfer medium flowing in the evaporator.

Therefore, with the above-described first aspect, the flow rate of the heat transfer medium can be calculated without using a flow meter. In addition, with the present invention, by using the planned value of the flow rate of the heat transfer medium based on the flow rate of the heat transfer medium obtained by means of back-calculation, the command value for controlling the degree-of-opening of the expansion valve can be set at an appropriate value, thus making it possible to set the flow rate of the refrigerant so as to be appropriate.

On the other hand, a heat-source unit according to a second aspect of the present invention is provided with a compressor that compresses a refrigerant; a condenser that condenses the compressed refrigerant by means of a heat-source medium; an evaporator that evaporates the condensed refrigerant and also performs heat exchange between this refrigerant and a heat transfer medium; an expansion valve that allows liquid-phase refrigerant retained in the condenser to expand; and the above-described heat transfer medium flow rate estimating device, wherein updating processing for updating a planned value of the flow rate of the heat, transfer medium is performed based on the flow rate of the heat transfer medium that is back-calculated by the heat-transfer-medium-flow-rate back-calculating portion; the flow rate of the refrigerant is calculated by the refrigerant-flow-rate calculating portion based on that updated planned value; and the degree-of-opening of the expansion valve is controlled in accordance with the calculated flow rate of the refrigerant.

With the above-described second aspect, the heat-source unit performs the updating processing for updating the planned value of the flow rate of the heat transfer medium in accordance with the flow rate of the heat transfer mediums back-calculated by the heat-transfer-medium-flow-rate back-calculating portion provided in the heat-transfer-medium flow rate estimating device; calculates the flow rate of the refrigerant by means of the refrigerant-flow-rate calculating portion based on that updated planned value; and controls the degree-of-opening of the expansion valve in accordance with the calculated flow rate of the refrigerant.

By doing so, the flow rate of the actually circulating refrigerant can be set at an appropriate value, and, as a result, operation at a high COP is possible.

In addition, with the heat-source unit according to the second aspect described above, in the updating processing, the planned value of the flow rate of the heat transfer medium may be updated so as to be at an internal division point between the planned value of the flow rate of the heat transfer medium and the flow rate of the heat transfer medium that is back-calculated by the heat-transfer-medium-flow-rate back-calculating portion.

With the above-described second aspect, because the new planned value of the flow rate of the heat transfer medium is updated so as to be at the internal division point between the planned value of the flow rate of the heat transfer medium and the flow rate of the heat transfer medium that has been back-calculated by the heat-transfer-medium-flow-rate back-calculating portion, the flow rate of the heat transfer medium is gradually corrected, and thus, it is possible to prevent sudden changes in the flow rate of the heat transfer medium.

In addition, with the heat-source unit according to the second aspect described above, the updating processing may be performed when a state of deviation between the planned value of the flow rate of the heat transfer medium and the flow rate of the heat transfer medium that is back-calculated by the heat-transfer-medium-flow-rate back-calculating port ion matches a state of a phenomenon occurring in the unit, When the state of deviation between the planned value of the flow rate of the heat transfer medium and the back-calculated flow rate of the heat transfer medium does not match the state of a phenomenon occurring in the heat-source unit, it is likely that an abnormality is occurring in the flow rate of the heat-source medium. Even if the planned value of the flow rate of the heat transfer medium is updated in such a case, the heat-source unit cannot be operated appropriately. Because of this, with the present invention, the updating processing for updating the planned value of the flow rate of the heat transfer medium is performed when the state of the deviation between the planned value of the flow rate of the heat transfer medium and the back-calculated flow rate of the heat transfer medium matches the state of the phenomenon occurring in the heat-source unit; therefore, it is possible to perform effective control of the flow rate of the heat transfer medium.

In addition, with the heat-source unit according to the second aspect described above, the updating processing may be performed when a difference between motor power input of the compressor determined from a theoretical value of the coefficient of performance of the heat-source unit and a measured value of the motor power input of the compressor is equal to or greater than a predetermined value.

When there is a deviation between the motor power input of the compressor determined based on a theoretical value of the coefficient of performance of the heat-source unit and a measured value of the motor power input of the compressor, it is likely that the flow rate of the refrigerant is inappropriate, that is, it is likely that the planned value of the flow rate of the heat transfer medium used for calculating the flow rate of the refrigerant is inappropriate. Thus, with the above-described second aspect, the updating processing for updating the planned value of the flow rate of the heat transfer medium is performed when the difference between the motor power input of the compressor determined based on the theoretical value of the coefficient of performance of the heat-source unit and the measured value of the motor power input of the compressor is equal to or greater than the predetermined value; therefore, the updating processing for the flow rate of the heat transfer medium can be performed at more effective timing.

In addition, with the heat-source unit according to the second aspect described above, the updating processing may be performed when a difference between a heat-transfer-medium load and a load determined from a current flowing in a motor that drives the compressor is equal to or greater than a predetermined value.

It is likely that a deviation between the heat-transfer-medium load and the load determined based on the current flowing in the motor that drives the compressor occurs because the flow rate of the refrigerant is inappropriate, that, is, because the planned value of the flow rate of the heating medium used to calculate the flow rate of the refrigerant is inappropriate. Thus, with the above-described second aspect, the updating processing for updating the planned value of the flow rate of the heat transfer medium is performed when the difference between the heat-transfer-medium load and the load determined based on the current flowing in the motor that drives the compressor is equal to or greater than the predetermined value; therefore, the updating processing for the flow rate of the heat transfer medium can be performed at more effective timing.

In addition, with the heat-source unit according to the second aspect described above, the updating processing may be performed when a difference between a temperature at which the heat transfer medium flows out of the evaporator and a saturation temperature inside the evaporator or a difference between a temperature at which the heat-source medium flows out of the condenser and a saturation temperature inside the condenser does not fall within a predetermined range.

When the difference between the temperature at which the heat transfer medium flows out of the evaporator and the saturation temperature inside the evaporator or the difference between the temperature at which the heat-source medium flows out of the condenser and the saturation temperature inside the condenser is too large or too small, it is likely that the operating state of the heat-source unit is inappropriate, that is, the flow rate of the refrigerant is inappropriate. Thus, with the above-described second aspect, the updating processing for updating the planned value of the flow rate of the heat transfer medium is performed when the difference between the temperature at which the heat transfer medium flows out of the evaporator and the saturation temperature inside the evaporator or the difference between the temperature at which the heat-source medium flows out of the condenser and the saturation temperature inside the condenser does not fall within the predetermined range; therefore, the updating processing for the flow rate of the heat transfer medium can be performed at more effective timing.

Furthermore, a heat-transfer-medium flow rate estimating method according to a third aspect of the present invention is a heat-transfer-medium flow rate estimating method for estimating the flow rate of a heat transfer medium in a heat-source unit provided with a compressor that compresses a refrigerant, a condenser that condenses the compressed refrigerant by means of a heat-source medium, an evaporator that evaporates the condensed refrigerant and also performs heat exchange between this refrigerant and the heat transfer medium, and an expansion valve that allows liquid-phase refrigerant retained in the condenser to expand, the method including a first step of calculating a heat quantity exchanged between the refrigerant and the heat transfer medium at the evaporator based on a planned value of the flow rate of the heat transfer medium and a measured value of the temperature of the heat transfer medium flowing in the evaporator, and of calculating the flow rate of the refrigerant flowing in the evaporator from that heat quantity; and a second step of back-calculating the flow rate of the refrigerant flowing in the evaporator based on the flow rate of the refrigerant calculated in the first step and a ratio between a set value of the differential pressure between the condenser and the evaporator and a measured value of that differential pressure, of back-calculating the heat quantity exchanged between the refrigerant and the heat transfer medium at the evaporator from the back-calculated flow rate of the refrigerant, and of back-calculating the flow rate of the heat transfer medium based on the back-calculated heat quantity and the measured value of the temperature of the heat transfer medium flowing in the evaporator.

Advantageous Effects of Invention

The present invention affords an excellent advantage in that the flow rate of a heat transfer medium can be calculated without using a flow rate meter.

DESCRIPTION OF EMBODIMENTS

Embodiments of a device for estimating heat-transfer-medium flow rate, a heat-source unit, and a method of estimating the heat-transfer-medium flow rate according to the present invention will be described below with reference to the drawings.

First Embodiment

A first embodiment of the present invention will be described below.

Figure 1:
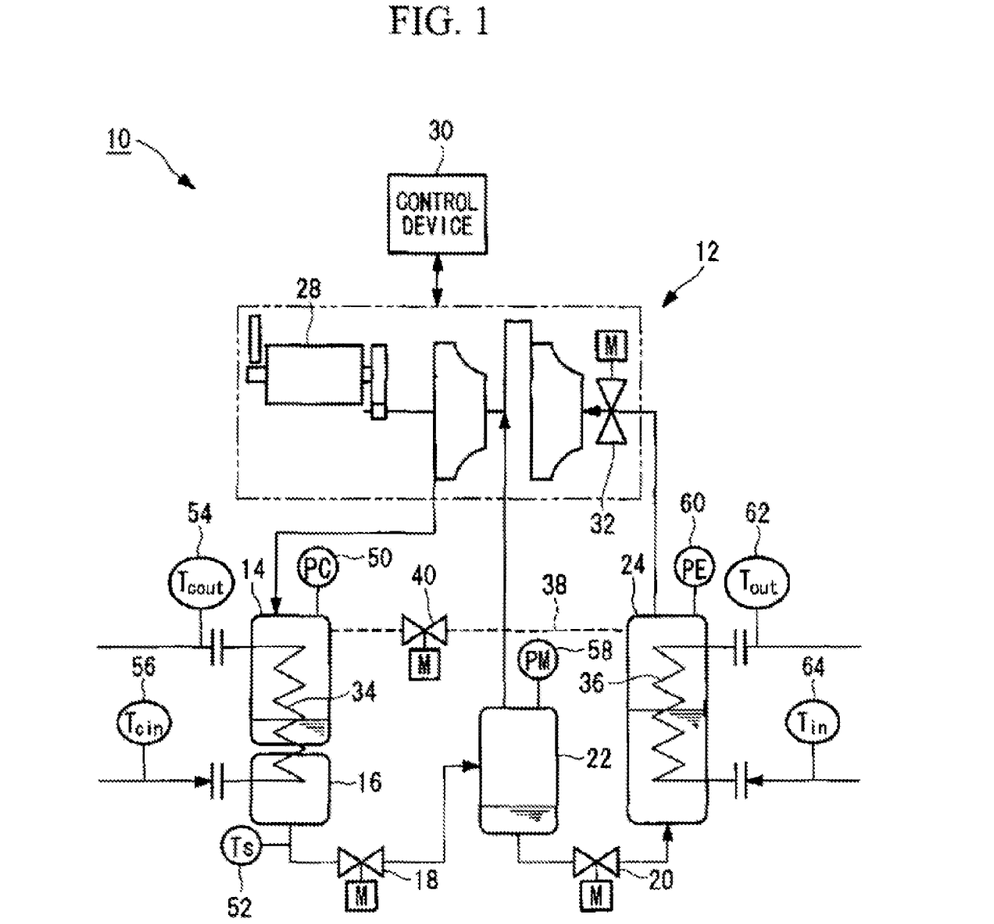
FIG. 1 is a configuration diagram of a centrifugal chiller according to a first embodiment of the present, invention.

FIG. 1 shows the configuration of a centrifugal chiller 10, which is an example of a heat-source unit according to the first embodiment.

The centrifugal chiller 10 is provided with a centrifugal compressor 12 that compresses refrigerant; a condenser 14 that condenses high-temperature, high-pressure gaseous refrigerant compressed at the centrifugal compressor 12 by means of a heat-source medium (cooling water); a subcooler 16 that subcools liquid-phase refrigerant (liquid refrigerant) that is condensed at the condenser 14; a high-pressure expansion valve 18 that allows the liquid refrigerant from the subcooler 16 to expand; an intermediate cooler 22 that is connected to the high-pressure expansion valve 18 and that is also connected to an intermediate stage of the centrifugal compressor 12 and a low-pressure expansion valve 20; and an evaporator 24 that evaporates the liquid refrigerant, which is allowed to expand by the low-pressure expansion valve 20, and also performs heat exchange between this refrigerant and a heat transfer medium (chilled water).

The centrifugal compressor 12 is a centrifugal two-stage compressor and is driven by an electric motor 28 whose rotational speed is controlled by an inverter (not shown). At a refrigerant intake port of the centrifugal compressor 12, a compressor inlet vane (IGV) 32 that controls the intake refrigerant flow rate is provided, thus enabling capacity control of the centrifugal chiller 10.

The condenser 14 is provided with a condenser pressure sensor 50 for measuring the pressure inside the condenser 14 (hereinafter, referred to as "condenser pressure").

The subcooler 16 is provided on the downstream side of the condenser 14 with respect to the flow of the refrigerant so as to subcool the condensed refrigerant. A refrigerant temperature sensor 52 that measures the subcooled refrigerant temperature is provided immediately after the subcooler 16 on the downstream side thereof with respect to the flow of the refrigerant.

A cooling heat-transmitting pipe 34 for cooling the condenser 14 and the subcooler 16 passes through them. The temperature of cooling water that flows out of the condenser 14 in the cooling heat-transmitting pipe 34 (hereinafter, referred to as "cooling-water outlet temperature") is measured by a cooling-water outlet temperature sensor 54. In addition, the temperature of the cooling water that flows into the condenser 14 in the cooling heat-transmitting pipe 34 (hereinafter, referred to as "cooling-water inlet temperature") is measured by a cooling-water inlet temperature sensor 56. Note that the cooling water is guided to the condenser 14 and the subcooler 16 again after externally exhausting the heat thereof at a cooling tower (not shown).

The intermediate cooler 22 is provided with an intermediate pressure sensor 58 for measuring an intermediate pressure.

In addition, the evaporator 24 serving as a heat exchanger is provided with an evaporator pressure sensor 60 for measuring the pressure inside the evaporator 24 (hereinafter, referred to as "evaporator pressure"). Refrigerant having a rated temperature (for example, 7° C.) is obtained by means of heat absorption at the evaporator 24. A chilled-water heat-transmitting pipe 36 for chilling chilled water to be supplied to an external load passes through the evaporator 24. Note that the temperature of the chilled water that flows out of the evaporator 24 in the chilled-water heat-transmitting pipe 36 (hereinafter, referred to as "chilled-water outlet temperature") is measured by a chilled-water outlet temperature sensor 62, and the temperature of the chilled water that flows into the evaporator 24 in the chilled-water heat-transmitting pipe 36 (hereinafter, referred to as "chilled-water inlet temperature") is measured by a chilled-water inlet temperature sensor 64.

In addition, a hot-gas bypass pipe 38 is provided between a gas-phase portion in the condenser 14 and a gas-phase portion in the evaporator 24. Also, the hot-gas bypass pipe 38 is provided with a hot-gas bypass valve 40 for controlling the flow rate of the refrigerant that flows in the hot-gas bypass pipe 38. By adjusting the flow rate of bypassed hot gas by means of the hot-gas bypass valve 40, it is possible to perform capacity control in an extremely small region that cannot be sufficiently controlled with the compressor inlet vane 32.

In addition, the centrifugal chiller 10 is provided with a control device 30.

The control device 30 is provided with a CPU (Central Processing Unit), a RAM (Random Access Memory), a ROM (Read Only Memory), an external interface, and so forth that are individually connected by means of a system bus, thus making it possible to send and receive various types of information.

The control device 30 receives, via the external interface, inputs of signals measured by the individual temperature sensors, pressure sensors, and so forth, and, based on these signals or the like, generates control signals for controlling the centrifugal compressor 12 and various valves by means of the CPU. Then, the control device 30 executes overall control of the centrifugal chiller 10 by outputting the generated control signals to the centrifugal compressor 12 and various valves via the external interface.

Here, the centrifugal chiller 10 according to the first embodiment is not provided with flow rate sensors that measure flow rates of the chilled water and the cooling water for reasons such as the high cost of the flow meters that measure flow rate, the need to reduce the number of parts, and so forth. However, the flow rate of the chilled water needs to be managed in order to operate the chiller at a design value.

Therefore, the control device 30 according to the first embodiment performs chilled-water flow-rate estimation calculation processing for setting the flow rate of the chilled water to an appropriate value.

Figure 2:
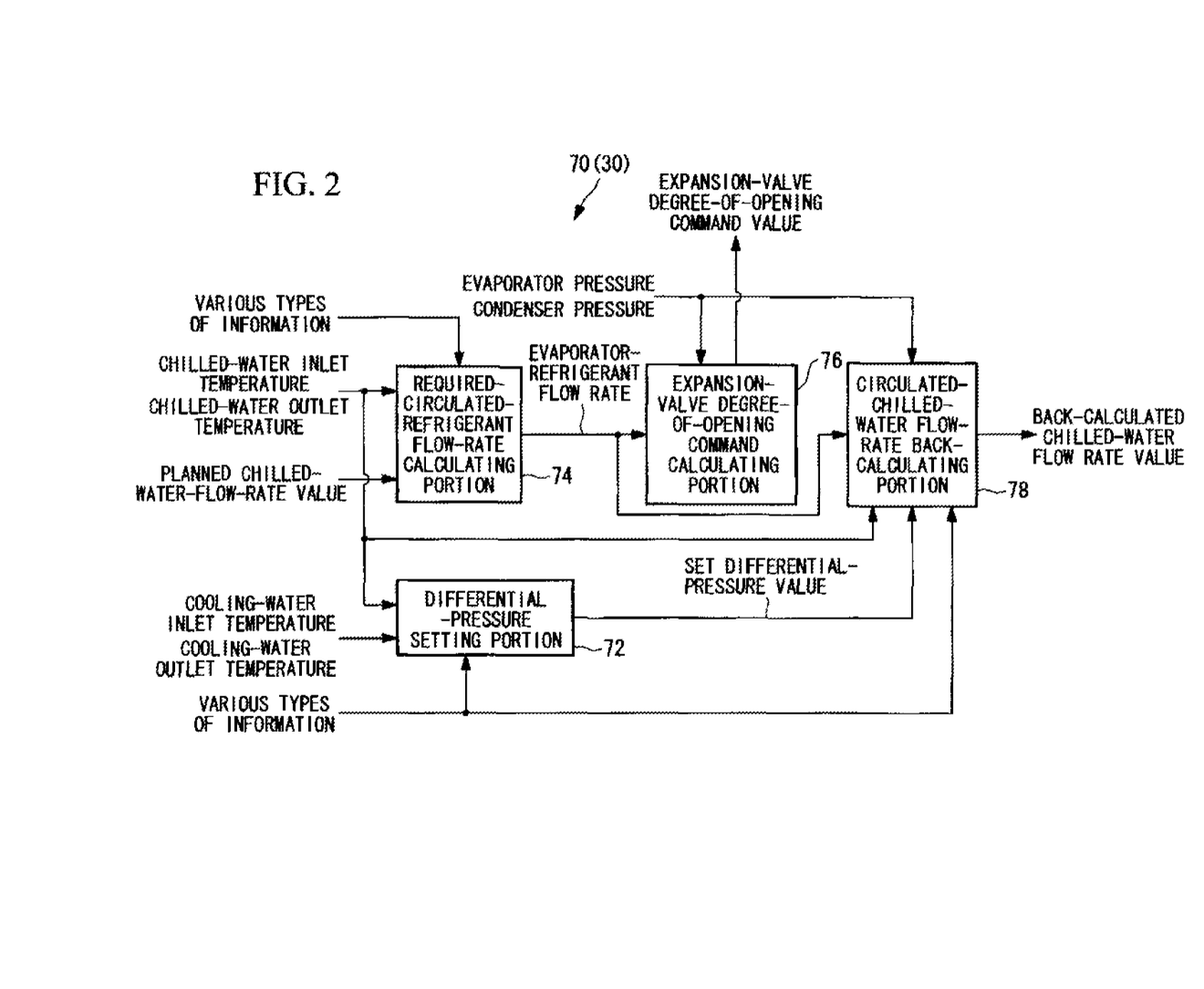
FIG. 2 is a functional block diagram showing the configuration of a chilled-water flow-rate estimation calculation portion according to the first, embodiment of the present invention.

FIG. 2 is a functional block diagram showing the configuration of a chilled-water flow-rate estimation calculation portion 70 that performs the chilled-water flow-rate estimation calculation processing, which is performed at the control device 30 according to the first embodiment.

The chilled-water flow-rate estimation calculation portion 70 is provided with a differential-pressure setting portion 72, a required-circulated-refrigerant flow-rate calculating portion 74, an expansion-valve degree-of-opening command calculating portion 76, and a circulated-cool-water flow-rate back-calculating portion 78.

The differential-pressure setting portion 72 calculates a differential pressure between a set condenser-pressure value, which is set in accordance with the temperature of the cooling water, and a set evaporator-pressure value, which is set in accordance with the temperature of the chilled water.

The differential-pressure setting portion 72 calculates a condenser saturation temperature $T_c'$ [° C.] in order to calculate the set. condenser-pressure value.

{Eq. 1}

$$T_c' = T_{cli} + \frac{Q_e}{Q_{std}}(\Delta T_{cl} + \Delta T_c) \quad (1)$$

Here, $T_{cli}$ is the cooling-water inlet temperature [° C.], $Q_e$ is a chilled-water load [kW], $Q_{std}$ is a rated refrigeration capacity [kW], $\Delta T_{cl}$ is a rated cooling-water temperature difference [° C.], and $\Delta T_c$ is a rated condenser temperature difference [° C.]. The chilled-water load $Q_e$ is calculated based on the difference between the chilled-water inlet temperature and the chilled-water outlet temperature and a planned value of the flow rate of the chilled water (hereinafter, referred to as "planned chilled-water-flow-rate value") used for a control computation for the centrifugal chiller 10.

In addition, P(T) is a saturation pressure [MPaabs] at a saturation temperature T (° C.), and the differential-pressure setting portion 72 calculates a set. condenser-pressure value $P_c'$ [MPaabs] from Expression (2), described below, by using the condenser saturation temperature $T_c'$ calculated using Expression (1).

{Eq. 2}

$$P_c' = P(T_c') \quad (2)$$

In addition, the differential-pressure setting portion 72 calculates an evaporator saturation temperature $T_e'$ [° C.] in order to calculate the set evaporator-pressure value.

{Eq. 3}

$$T_e' = T_{set} + \frac{Q_e}{Q_{std}}\Delta T_e \quad (3)$$

Here, $T_{set}$ is a set chilled-water outlet temperature value [° C.], and $\Delta T_e$ is a rated evaporator temper at lire difference [° C.].

Then, the differential-pressure setting portion 72 calculates a set evaporator-pressure value $P_e'$ [MPaabs] from Expression (4), described below, by using the evaporator saturation temperature $T_e'$ calculated using Expression (3).

{Eq. 4}

$$P_e' = P(T_e') \quad (4)$$

The differential-pressure setting portion 72 outputs the difference $(P_c'-P_e')$ between the set condenser-pressure value and the set evaporator-pressure value, calculated as above, to the circulated-chilled-water flow-rate back-calculating portion 78 as a set differential-pressure value.

The required-circulated-refrigerant flow-rate calculating portion 74 calculates the heat quantity exchanged between the refrigerant and the chilled water at the evaporator 24 (hereinafter, referred to as "evaporator exchanged heat quantity") based on the planned chilled-water-flow-rate value and a measured value of the temperature of chilled water flowing in the evaporator 24, and calculates the flow rate of the refrigerant flowing in the evaporator 24 (hereinafter, referred to as "evaporator-refrigerant flow rate") based on the evaporator exchanged heat quantity.

Specifically, first, the required-circulated-refrigerant flow-rate calculating portion 74 calculates an evaporator exchanged heat quantity $Q_e$ by using a planned chilled-water-flow-rate value $G_{ew}$ [m³/s] used for the control computation.

{Eq. 5}

$$Q_e = c_p \times \rho \times G_{ew} \times (T_{wi} - T_{wo}) \quad (5)$$

Here, $c_p$ is the specific heat of water [kJ/(kg·° C.)], $\rho$ is the density of water [kg/mJ], $T_{wi}$ is the chilled-water inlet temperature [° C.] measured by the chilled-water inlet temperature sensor 64, and $T_{wo}$ is the chilled-water outlet temperature [° C.] measured by the chilled-water outlet temperature sensor 62.

Next, the required-circulated-refrigerant flow-rate calculating portion 74 calculates an evaporator-refrigerant flow rate $G_e$ by using the evaporator exchanged heat quantity $Q_e$ calculated using Expression (5).

{Eq. 6}

$$G_e = \frac{Q_e}{h_1 - h_5} \quad (6)$$

Here, h1 is the enthalpy at the outlet of the evaporator 24 and h5 is the enthalpy at the inlet of the evaporator 24; and the enthalpies h1 and h5 are calculated from the pressure and temperature of the refrigerant.

Figure 3A:
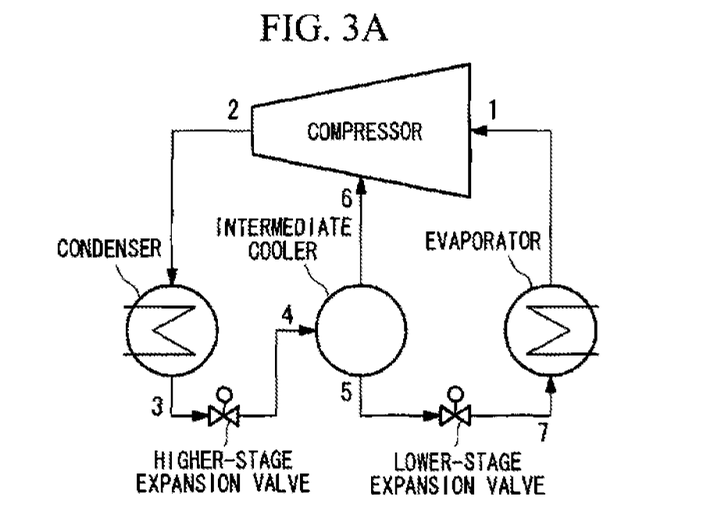
FIG. 3A is a diagram for explaining enthalpy used for calculating the evaporator-refrigerant, flow rate according to the first embodiment of the present invention.
Figure 3B:
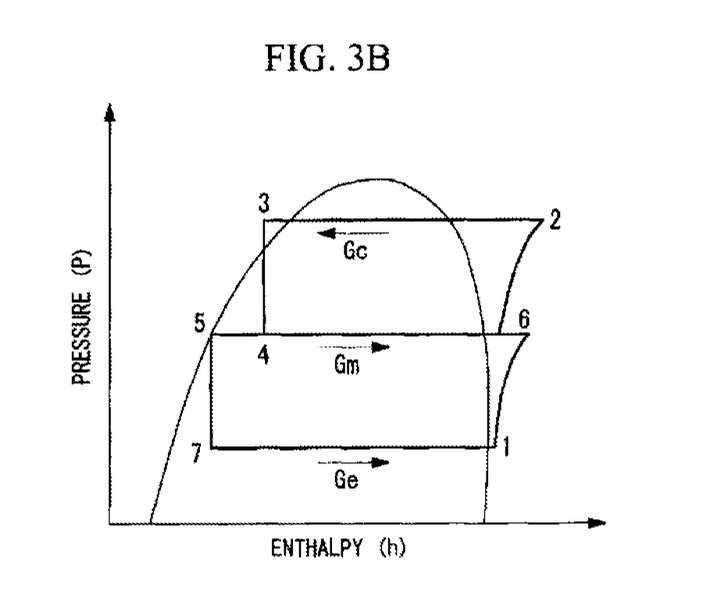
FIG. 3B is a diagram for explaining the enthalpy used for calculating the evaporator-refrigerant flow rate according to the first embodiment of the present invention.

FIG. 3A is a diagram of a refrigerant circuit of the centrifugal chiller 10 provided with the intermediate cooler 22, and the enthalpy h1 at the outlet of the evaporator 24 that corresponds to "1" in FIG. 3A is "1" in a cycle diagram (p-h diagram) shown in FIG. 3B. On the other hand, the enthalpy h5 at the inlet of the evaporator 24 that corresponds to "5" in FIG. 3A is "5" in the cycle diagram shown in FIG. 3B.

The expansion-valve degree-of-opening command calculating portion 76 calculates a Cv value of an expansion valve in accordance with the evaporator-refrigerant flow rate $G_e$ calculated by the required-circulated-refrigerant flow-rate calculating portion 74.

{Eq. 7}

$$Cv = f\left(\frac{G_e}{P_c - P_e}\right) \quad (7)$$

Here, $P_c$ is the condenser pressure measured by the condenser pressure sensor 50, and $P_e$ is the evaporator pressure measured by the evaporator pressure sensor 60.

The Cv value calculated using Expression (7) is used to calculate command values for controlling the degree-ofopening of the high-pressure expansion valve 18 and the low-pressure expansion valve 20 (hereinafter, referred to as "expansion-valve degree-of-opening command values"). Note that the expansion-valve degree-of-opening command values are increased in accordance with the magnitude of the Cv value. Mote that when the high-pressure expansion valve 18 and the low-pressure expansion valve 20 are not distinguished in the following descriptions, they are referred to simply as expansion valves.

The circulated-chilled-water flow-rate back-calculating portion 78 back-calculates the flow rate of the chilled water based on the set differential-pressure value calculated by the differential-pressure setting portion 72, the evaporator-refrigerant flow rate calculated by the required-circulated-refrigerant flow-rate calculating portion 74, and measurement results from various sensors.

Specifically, first, the circulated-chilled-water flow-rate back-calculating portion 78 back-calculates an evaporator-refrigerant flow rate $G_e'$, which is the flow rate of the chilled water flowing in the evaporator 24, based on the evaporator-refrigerant flow rate $G_e$ calculated by the required-circulated-refrigerant flow-rate calculating portion 74 and a ratio between the set differential-pressure value calculated by the differential-pressure setting portion 72 and a measured value of the differential pressure between the condenser pressure and the evaporator pressure (hereinafter, referred to as "measured differential-pressure value").

{Eq. 8}

$$G_e' = \frac{P_c' - P_e'}{P_c - P_e} \times G_e \quad (8)$$

Next, the circulated-chilled-water flow-rate back-calculating portion 78 back-calculates an evaporator exchanged heat quantity $Q_e'$, which is exchanged between the refrigerant and the chilled water at the evaporator 24, from the evaporator-refrigerant flow rate $G_e'$ back-calculated using Expression (8).

{Eq. 9}

$$Q_e' = G_e' \times (h_1 - h_5) \quad (9)$$

Then, the circulated-chilled-water flow-rate back-calculating portion 78 back-calculates a chilled-water flow rate $G_{ew}'$ [m$^3$/s] based on the evaporator exchanged heat quantity $Q_e'$ back-calculated using Expression (9) and the measured value of the temperature of the chilled water flowing in the evaporator 24.

{Eq. 10}

$$G_{ew}' = \frac{Q_e'}{c_p \times \rho \times (T_{wi} - T_{wo})} \quad (10)$$

Specifically, as is clear from Expression (8), when the set differential-pressure value matches the measured differential-pressure value, the planned chilled-water-flow-rate value matches an estimation calculation value of the chilled-water flow rate determined by means of back-calculation (hereinafter, referred to as "chilled-water-flow-rate estimation calculation value"), and thus, it is clear that the planned chilled-water-flow-rate value is appropriate.

On the other hand, if the set differential-pressure value differs from the measured differential-pressure value, the planned chilled-water-flow-rate value differs from the chilled-water-flow-rate estimation calculation value, and thus, it is clear that the planned chilled-water-flow-rate value is inappropriate.

In such a case, in order to match the set differential-pressure value and the measured differential-pressure value and to set the flow rate of the refrigerant to an appropriate value, the control device 30 performs updating processing for updating (changing) the planned chilled-water-flow-rate value to be used for calculating the expansion-valve degree-of-opening command value.

Figure 4:
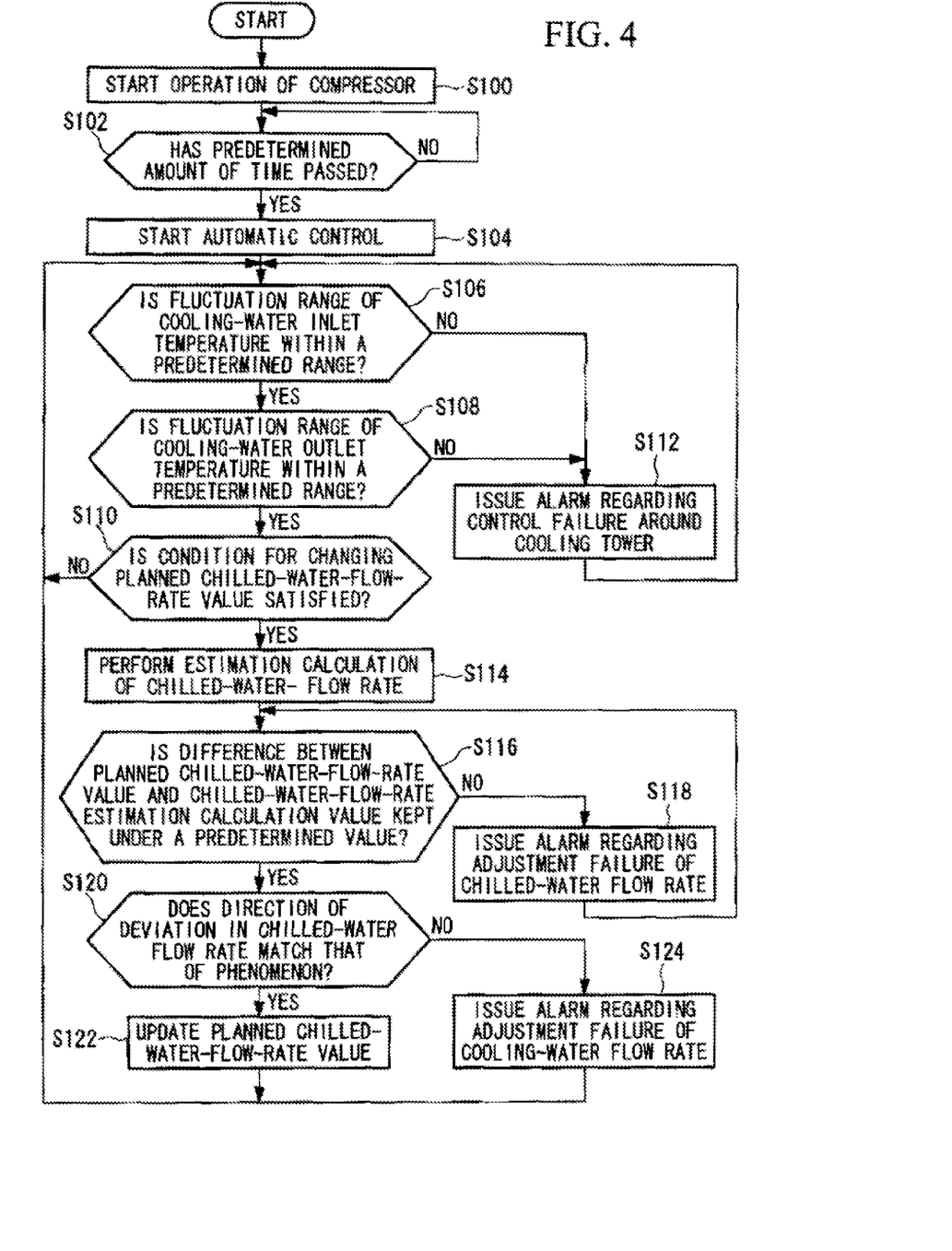
FIG. 4 is a flowchart showing the flow of processing in a chiller-control program according to the first embodiment of the present invention.

FIG. 4 is a flowchart showing the flow of processing in a chiller control program including the updating processing for updating the planned chilled-water-flow-rate value, and the chiller control program is stored in advance in a predetermined region of a storage portion (not shown) provided in the control device 30. Note that this program is executed by the CPU provided in the control device 30, is started together with the centrifugal chiller 10 when an instruction to start the operation thereof is given, and ends together with the centrifugal chiller 10 when an instruction to stop the operation thereof is given.

First, in Step 100, the operation of the centrifugal compressor 12 is started.

In Step 102 that, follows, the operation is put into a standby mode until a predetermined amount of time passes, and the process advances to Step 104 once the predetermined amount of time passes. Note that the predetermined amount of time refers to an amount of time required for the circulation of the refrigerant to stabilize, for example, three minutes.

In Step 104, automatic control of the centrifugal chiller 10 is started. Note that, in the automatic control, various computations are performed by using average values of the fluctuating temperature and pressure so that the temperature and pressure used in various computations can be assumed to be constant.

In Step 106 that follows, it is judged whether or not the fluctuation range of the cooling-water inlet temperature measured by the cooling-water inlet, temperature sensor 56 is within a predetermined range; if the judgment is positive, the process advances to Step 103; and, if the judgment is negative, the process advances to Step 112. Note that the predetermined range is, for example, ±2° C.

In Step 108, it is judged whether or not the fluctuation range of the cooling-water outlet temperature measured by the cooling-water outlet temperature sensor 54 is within a predetermined range; if the judgment is positive, the process advances to Step 110; and, if the judgment is negative, the process advances to Step 112. Note that the predetermined range is, for example, ±2° C.

In Step 110, it is judged whether or not conditions for updating the planned chilled-water-flow-rate value are satisfied; if the judgment is positive, the process advances to Step 114; and, if the judgment is negative, the process returns to Step 106.

Note that the case in which the conditions for updating the planned chilled-water-flow-rate value according to the first embodiment are satisfied refers to a case in which the difference between motor power input of the centrifugal compressor 12 determined from a theoretical value of the coefficient of performance (theoretical COP) for the centrifugal chiller 10 and a measured value of the motor power input of the centrifugal compressor 12 becomes equal to or greater than a predetermined value (for example, 5%). This is because it is likely that the flow rate of the refrigerant is inappropriate, that, is, it is likely that the planned chilledwater-flow-rate value used for calculating the flow rate of the refrigerant is inappropriate, when there is a deviation between the motor power input, of the centrifugal compressor 12 determined from the theoretical COP and the measured value of the motor power input of the centrifugal compressor 12.

Therefore, a motor power input W of the centrifugal compressor 12 is calculated by using Expression (11), described below, in which the theoretical COP ($COP_{cal}$) of the centrifugal chiller 10 is used.

{Eq. 11}

$$W = \frac{Q'_e}{COP_{cal}} \quad (11)$$

On the other hand, the measured value of the motor power input of the centrifugal compressor 12 is calculated from the power to be supplied to the electric motor 28 for driving the centrifugal compressor 12.

Note that the theoretical COP is derived based on equipment characteristics of the centrifugal chiller 10, and is calculated by means of a first computational expression for calculating a relative load factor $Qf_r$ that relatively expresses a current load factor at a current cooling-water inlet temperature relative to a predetermined load factor at a predetermined cooling-water inlet temperature set as a reference operation point, a second computational expression that expresses the relationship between the relative load factor $Qf_r$ and a correction coefficient Cf, and a third computational expression that corrects a COP calculation expression derived from the reverse Carnot cycle with the correction coefficient Cf described above.

More specifically, first, the COP calculation expression derived from the reverse Carnot cycle is given by, for example, Expression (A) below.

$$COP_{carnot} = (T_{LO} + 273.15)/(T_{HO} - T_{LO}) \quad (A)$$

In Expression (A) described above, $T_{LO}$ is the chilled-water outlet temperature [° C.] and $T_{HO}$ is the cooling-water outlet temperature [° C.].

Then, the first computational expression, the second computational expression, and the third computational expression are given as below.

First computational expression: $Q_r = 0.1 \times (H_{ad}/19.4)^{1/2}$ (B)

$:Qf_r = Qf/Q_r$ (C)

Second computational expression: $Cf = Ff(Qf_r)$ (D)

Third computational expression: $COP_{cal} = (\{(T_{LO} + 273.15)/(T_{HO} - T_{LO})\}/Cf$ (E)

As indicated in Expression (C), the relative load factor $Qf_r$ is derived by using the actual load factor Qf and a relative design air volume coefficient $Q_r$, which is an equipment characteristic of the centrifugal compressor 12, indicated in Expression (B). In addition, a compressor adiabatic head $H_{ad}$ in Expression (B) is obtained by means of Expression (F) below based on thermodynamic characteristics.

$$H_{ad} = (-2.7254 \times 10^{-4} T_{LO}^2 - 9.0244 \times 10^{-3} T_{LO} + 47.941) \times \{\log_{10} P_c - \log_{10} P_e\} \times 1000/9.8067 \quad (F)$$

In Expression (F), $P_c$ is the saturation pressure [MPa] of the condenser, $P_e$ is the saturation pressure [MPa] of the evaporator, $T_c$ is the saturation temperature [° C.] of the condenser, and $T_s$ is the saturation temperature [° C.] of the evaporator.

In Step 112, an alarm regarding control failure around the cooling tower is issued, and the process advances to Step 106. Note that when this alarm is issued, an operator of the centrifugal chiller 10 responds as he/she should when this alarm is issued, thus eliminating the control failure around the cooling tower.

In Step 114, the chilled-water flow-rate estimation calculation portion 70 performs estimation calculation of the chilled-water flow rate.

In Step 116 that follows, it is judged whether or not the difference between the planned chilled-water-flow-rate value and the chilled-water-flow-rate estimation calculation value is kept under a predetermined value; if the judgment is positive, the process advances to Step 120; and, if the judgment is negative, the process advances to Step 118.

Note that, in the first embodiment, whether or not the difference between the planned chilled-water-flow-rate value $G_{ew}$ and the chilled-water-flow-rate estimation calculation value $G_{ew}'$ is kept under the predetermined value is judged by using, for example, Expression (12) described below.

{Eq. 12}

$$|G_{ew} - G'_{ew}| < k \times G_{ew} \quad (12)$$

Here, k is a predetermined constant, for example, 0.2.

Specifically, in Step 116, the judgment will be positive if Expression (12) is satisfied, in which case the process advances to Step 120, and the judgment, will be negative if Expression (12) is not satisfied, in which case the process advances to Step 118.

In Step 118, because the deviation between the planned chilled-water-flow-rate value and the chilled-water-flow-rate estimation calculation value is so large that the chilled-water flow rate cannot be made appropriate by means of the updating processing of the planned chilled-water-flow-rate value, an alarm regarding adjustment failure of the chilled-water flow rate is issued, and the process returns to Step 116. Note that, when this alarm is issued, the operator of the centrifugal chiller 10 responds as he/she should when this alarm is issued, thus eliminating the adjustment failure of the chilled-water flow rate.

In Step 120, it is judged whether or not the state of deviation between the planned chilled-water-flow-rate value and the estimated chilled-water-flow-rate value matches the state of phenomena occurring in the centrifugal chiller 10; if the judgment is positive, the process advances to Step 122; and, if the judgment is negative, the process advances to Step 124.

Note that the case in which the state of deviation between the planned chilled-water-flow-rate value $G_{ew}$ and the estimated chilled-water-flow-rate value $G_{ew}'$ matches the state of phenomena occurring in the centrifugal chiller 10 refers to, when $G_{ew}' > G_{ew}$, a case in which the difference between the chilled-water outlet temperature and the evaporator saturation temperature is greater than a rated value, and, when $G_{ew}' < G_{ew}$, a case in which a measured value of COP is smaller than the theoretical value of COP by an amount equal to or greater than a predetermined value (for example, 10%).

In Step 122, the planned chilled-water-flow-rate value is updated, and the process returns to Step 106. Note that, in the first embodiment, the planned chilled-water-flow-rate value is updated by updating the planned chilled-waterflow-rate value to an internal division point between the planned chilled-water-flow-rate value and the chilled-water-flow-rate estimation calculation value.

More specifically, the planned chilled-water-flow-rate value $G_{ew}$ is calculated by using Expression (13), described below, and the value is updated to this calculated planned chilled-water-flow-rate value $G_{ew}$.

{Eq. 13}

$$G_{ew} = k \times G'_{ew} + (1-k) \times G_{ew} \qquad (13)$$

Note that k is a predetermined constant.

Then, the required-circulated-refrigerant flow-rate calculating portion 74 calculates the evaporator-refrigerant flow rate by using the planned chilled-water-flow-rate value updated in Step 122. The expansion-valve degree-of-opening command calculating portion 76 calculates a Cv value by using the calculated evaporator-refrigerant flow rate, and calculates a new expansion-valve degree-of-opening command value in accordance with this Cv value. When the new expansion-valve degree-of-opening command value is input, the degree-of-opening of the valve is controlled in accordance with that expansion-valve degree-of-opening command value, and thus, the expansion valve allows the refrigerant to flow toward the evaporator 24 with a flow rate in accordance with the updated planned chilled-water-flow-rate value.

In Step 124, because it is likely that the cause of deviation between the planned chilled-water-flow-rate value and the estimated chilled-water-flow-rate value is an adjustment failure of the cooling-water flow rate, an alarm regarding the adjustment failure of the cooling-water flow rate is issued, and the process returns to Step 106. Note that, when this alarm is issued, the operator of the centrifugal chiller 10 responds as he/she should when this alarm is issued, thus eliminating the adjustment failure of the cooling-water flow rate.

As has been described above, the chilled-water flow-rate estimation calculation portion 70 according to the first embodiment calculates the evaporator exchanged heat quantity $Q_e$ of the evaporator 24 based on the planned chilled-water-flow-rate value $G_{ew}$ and the measured value of the temperature of the chilled water flowing in the evaporator 24, and calculates the evaporator-refrigerant, flow rate $G_e$ based on the evaporator exchanged heat quantity Qe. Then, the chilled-water flow-rate estimation calculation portion 70 back-calculates the evaporator-refrigerant, flow rate $G_e'$ based on the calculated evaporator-refrigerant flow rate $G_e$ and the ratio between the set differential-pressure value and the measured differential-pressure value, back-calculates the evaporator exchanged heat quantity $Q_e'$ from the back-calculated evaporator-refrigerant flow rate $G_e'$, and back-calculates the chilled-water-flow-rate estimation calculation value $G_{ew}'$ based on the back-calculated evaporator exchanged heat quantity $Q_e'$ and the measured value of the temperature of the chilled water flowing in the evaporator 24.

Therefore, with the control device 30 according to the first embodiment, the flow rate of the chilled water can be calculated without using a flow rate meter.

In addition, with the centrifugal chiller 10 according to the first embodiment, the updating processing for updating the planned chilled-water-flow-rate value is performed in accordance with the chilled-water-flow-rate estimation calculation value that, has been back-calculated, the flow rate of the refrigerant, is calculated based on the updated planned chilled-water-flow-rate value, and the degree-of-opening of the expansion valve is controlled in accordance with the calculated flow rate of the refrigerant.

By doing so, with the centrifugal chiller 10 according to the first embodiment, the flow rate of the actually circulating refrigerant can be set to an appropriate value, and, as a result, it is possible to operate at high COP.

In addition, with the centrifugal chiller 10 according to the first embodiment, because the new planned chilled-water-flow-rate value is updated so as to be at the internal division point between the planned chilled-water-flow-rate value and the chilled-water-flow-rate estimation calculation value that has been back-calculated, the chilled-water flow rate is gradually corrected, and thus, it is possible to prevent sudden changes in the chilled-water flow rate.

In addition, with the centrifugal chiller 10 according to the first embodiment, because the updating processing for updating the planned chilled-water-flow-rate value is performed when the state of deviation between the planned chilled-water-flow-rate value and the chilled-water-flow-rate estimation calculation value that has been back-calculated matches the state of phenomena occurring in the centrifugal chiller 10, it is possible to perform effective control of the chilled-water flow rate.

In addition, with the centrifugal chiller 10 according to the first embodiment, because the updating processing for updating the planned chilled-water-flow-rate value is performed when the difference between the motor power input of the centrifugal compressor 12 determined from the theoretical value of COP and the measured value of the motor power input of the centrifugal compressor 12 is equal to or greater than the predetermined value, the updating processing of the planned chilled-water-flow-rate value can be performed at more effective timing.

Second Embodiment

A second embodiment of the present invention will be described below.

Note that, because the configuration of a centrifugal chiller 10 according to the second embodiment is the same as the configuration of the centrifugal chiller 10 according to the first embodiment shown in FIGS. 1 and 2, a description thereof will be omitted. In addition, the processing flow in a chiller control program according to the second embodiment is the same as the processing flow in the chiller control program according to the first embodiment shown in FIG. 4.

However, conditions for changing the planned chilled-water-flow-rate value according to the second embodiment differ from the conditions for changing the planned chilled-water-flow-rate value according to the first embodiment.

The conditions for changing the planned chilled-water-flow-rate value according to the second embodiment are met when the difference between a chilled-water load and a load determined from a current flowing in the electric motor 28 that, drives the centrifugal compressor 12 is equal to or greater than a predetermined value (for example, 5%).

It is likely that a deviation occurs between the chilled-water load and the load determined from the current flowing in the electric motor 28 because the flow rate of the refrigerant is inappropriate, that is, because the planned chilled-water-flow-rate value used for calculating the flow rate of the refrigerant is inappropriate.

The load determined from the current flowing in the electric motor 28 is calculated by adding the rated load to the ratio of the measured current relative to the rated current of the electric motor 28.

As described above, with the centrifugal chiller 10 according to the second embodiment, the updating processing for updating the planned chilled-water-flow-rate value can be performed at more effective timing, because the updating processing for updating the planned chilled-water-flow-rate value is performed when the difference between the chilled-water load and the load determined from the current flowing in the electric motor 28 that drives the turbo compressor 12 is equal to or greater than the predetermined value.

Third Embodiment

A third embodiment of the present invention will be described below.

Note that, because the configuration of a centrifugal chiller 10 according to the third embodiment is the same as the configuration of the centrifugal chiller 10 according to the first embodiment shown in FIGS. 1 and 2, description thereof will be omitted. In addition, the processing flow in a chiller control program according to the third embodiment is the same as the processing flow in the chiller control program according to the first, embodiment shown in FIG. 4.

However, conditions for changing the planned chilled-water-flow-rate value according to the third embodiment differ from the conditions for changing the planned chilled-water-flow-rate value according to the first embodiment.

The conditions for changing the planned chilled-water-flow-rate value according to the third embodiment are met when the difference between the chilled-water outlet temperature and the evaporator saturation temperature or the difference between the cooling-water outlet temperature and the condenser saturation temperature does not fall within a predetermined range.

When the difference between the chilled-water outlet, temperature and the evaporator saturation temperature or the difference between the cooling-water outlet temperature and the condenser saturation temperature is too large or too small, it is likely that the operating state of the centrifugal chiller 10 is inappropriate, that is, the flow rate of the refrigerant is inappropriate.

Figure 5:
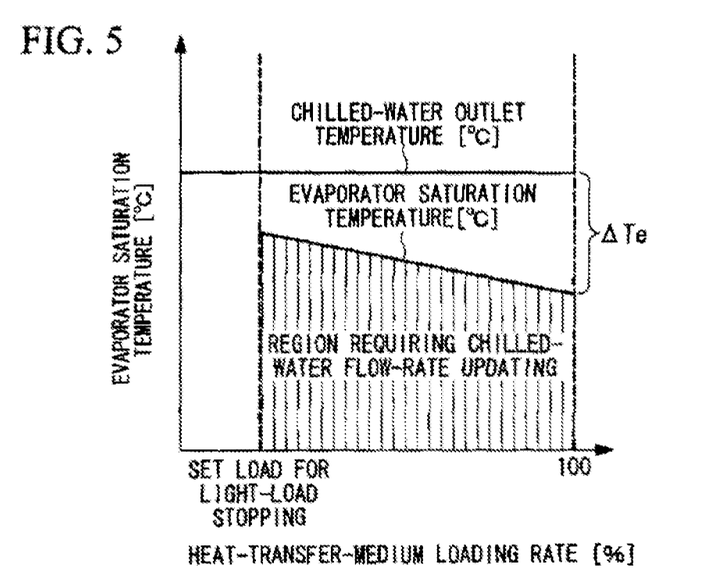
FIG. 5 is a graph showing the relationship between the loading rate and the difference between a chilled-water outlet temperature and an evaporator saturation temperature according to a third embodiment of the present invention.

FIG. 5 is a graph showing the relationship between the loading rate and the difference between the chilled-water outlet temperature and the evaporator saturation temperature. Note that the chilled-water outlet temperature is assumed to be a measured value or a set value. The loading rate is a proportion of the chilled-water load relative to the rated load, and 100% corresponds to the rated load.

Then, with the third embodiment, the conditions for changing the planned chilled-water-flow-rate value are judged to be satisfied and the updating processing of the planned chilled-water-flow-rate value is performed when the difference between the chilled-water outlet temperature and the evaporator saturation temperature is equal to or greater than a set value $\Delta Te$. In addition, the set value $\Delta Te$ is increased with an increase in the loading rate.

Note that it may be judged whether or not the difference between the chilled-water outlet temperature and the evaporator saturation temperature is too small; in other words, a lower-limit value may be set for the set value $\Delta Te$; however, because such a situation does not often occur, with the third embodiment, only an upper-limit value is set for the set value $\Delta Te$ for the difference between the chilled-water outlet temperature and the evaporator saturation temperature.

Figure 6:
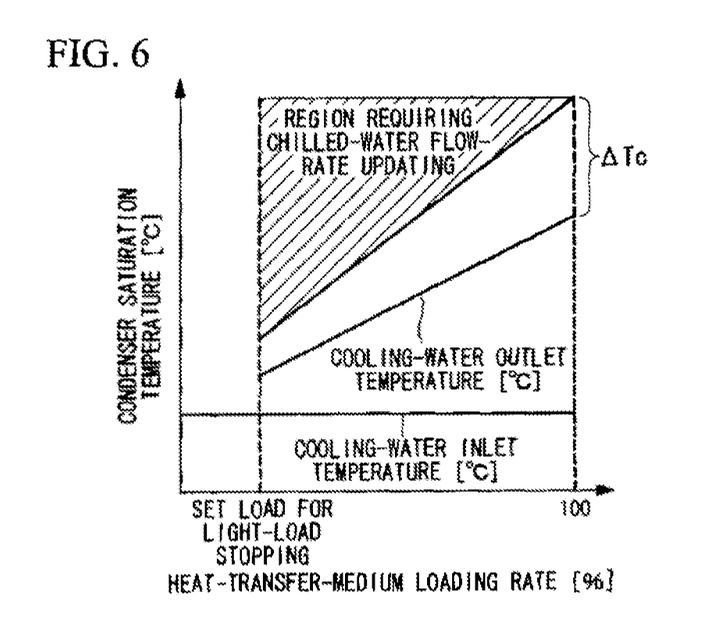
FIG. 6 is a graph showing the relationship between the loading rate and the difference between a cooling-water outlet temperature and a condenser saturation temperature according to the third embodiment of the present invention.

FIG. 6 is a graph showing the relationship between the loading rate and the difference between the cooling-water outlet temperature and the condenser saturation temperature. Note that the cooling-water outlet temperature is assumed to be a measured value or a set value.

Then, with the third embodiment, the conditions for changing the planned chilled-water-flow-rate value are judged to be satisfied and the updating processing of the planned chilled-water-flow-rate value is performed when the difference between the cooling-water outlet temperature and the condenser saturation temperature is equal to or greater than a set value $\Delta Tc$. In addition, the set value $\Delta Tc$ is increased with an increase in the loading rate.

Note that it may be judged whether or not the difference between the cooling-water outlet temperature and the condenser saturation temperature is too small; in other words, a lower-limit value may be set for the set value $\Delta Tc$; however, because such a situation does not often occur, with the third embodiment, only an upper-limit value is set for the set value $\Delta Tc$ for the difference between the cooling-water outlet temperature and the condenser saturation temperature.

As described above, with the centrifugal chiller 10 according to the third embodiment, the updating processing of the planned chilled-water-flow-rate value can be performed at more effective timing, because it is performed when the difference between the chilled-water outlet temperature and the evaporator saturation temperature or the difference between the cooling-water outlet temperature and the condenser saturation temperature does not fall within the predetermined range.

As above, although the present invention has been described by means of the individual embodiments described above, the technical scope of the present invention is not limited to the scope described in the embodiments described above. Various modifications or improvements can be incorporated into the individual embodiments described above within a range that does not depart from the scope of the invention, and the technical scope of the present invention also encompasses the forms in which such modifications or improvements are incorporated.

For example, although forms in which the centrifugal chiller 10 is provided with the intermediate cooler 22 have been described in the individual embodiments described above, the present invention is not limited thereto, and a form in which the chiller 10 is not provided with the intermediate cooler or a form in which an economizer is provided therein may be employed.

Figure 7A:
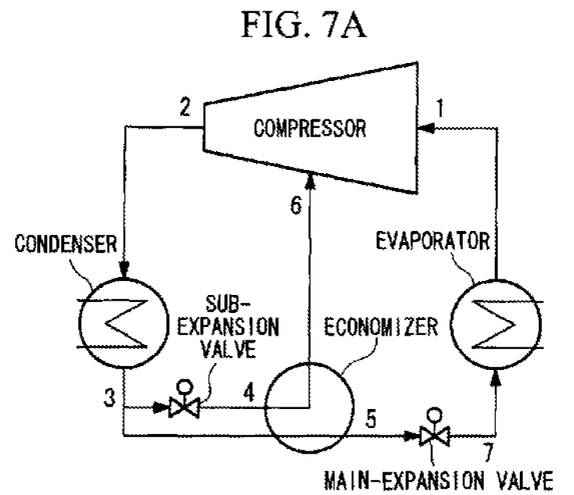
FIG. 7A is a diagram for explaining enthalpy used for calculating an evaporator-refrigerant flow rate for a chiller provided with an economizer.
Figure 7B:
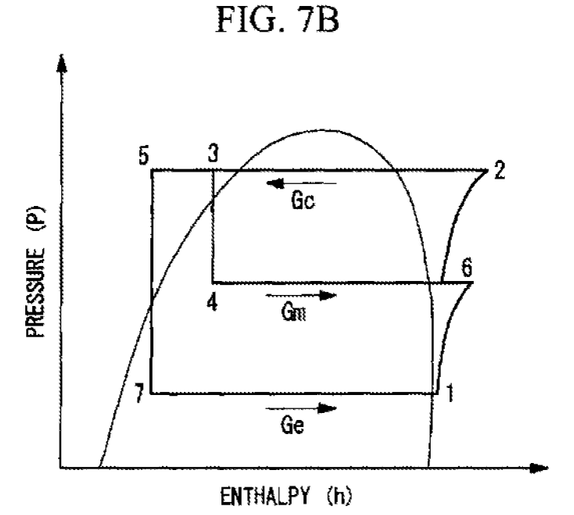
FIG. 7B is a diagram for explaining the enthalpy used for calculating the evaporator-refrigerant flow rate for the chiller provided with the economizer.

For the form in which the centrifugal chiller 10 is provided with an economizer, FIGS. 7A and 7B show the enthalpies h1 and h5 used for calculating the evaporator-refrigerant flow rate $G_e$ by means of Expression (6) described above.

FIG. 7A is a diagram of a refrigerant circuit of the centrifugal chiller 10 provided with the economizer, and the enthalpy h1 at the outlet of the evaporator 24 that corresponds to "1" in FIG. 7A is "1" in a cycle diagram (p-h diagram) shown in FIG. 7B. On the other hand, the enthalpy h5 at the inlet of the evaporator 24 that corresponds to "5" in FIG. 7A is "5" in the cycle diagram shown in FIG. 7B.

In addition, although forms in which the heat-source medium that flows inside the cooling heat-transmitting pipe 34 passing through the condenser 14 is assumed to be cooling water have been described in the individual embodiments described above, the present invention is not limited thereto, and a form in which the heat-source medium is assumed to be gas (external air) and the condenser is assumed to be an air heat exchanger may be employed.

In addition, although the cases in which the present invention is employed in the centrifugal chiller 10 that performs refrigeration operation have been described in the individual embodiments described above, without limitation thereto, the present, invention may be employed in a heat-pump centrifugal chiller that is also capable of heat-pump operation.

In addition, although the forms in which a centrifugal compressor is employed in the centrifugal chiller 10 have been described in the individual embodiments described above, the present invention is not limited thereto, and other compression systems can also be employed; for example, a screw heat pump employing a screw compressor may be employed.

In addition, the flow of processing in the chiller-control program described in the individual embodiments described above is also an example, and, within a range that does not depart from the scope of the present invention, unnecessary steps thereof may be eliminated, new steps may be added thereto, or the order of processing may be switched.

REFERENCE SIGNS LIST 10 centrifugal chiller
12 centrifugal compressor
14 condenser
24 evaporator
28 electric motor
30 control device
72 differential-pressure setting portion
74 required-circulated-refrigerant flow-rate calculating portion
78 circulated-chilled-water flow-rate back-calculating portion

The invention claimed is:

1. A heat-source unit comprising:
a compressor that compresses a refrigerant;
a condenser that condenses the compressed refrigerant by means of a heat-source medium;
an evaporator that evaporates the condensed refrigerant and also performs heat exchange between the refrigerant and a heat transfer medium;
an expansion valve that allows liquid-phase refrigerant retained in the condenser to expand; and
a heat transfer medium flow rate estimating device that estimates a flow rate of a heat transfer medium of a heat-source unit provided with a compressor that compresses a refrigerant, a condenser that condenses the compressed refrigerant by means of a heat-source medium, an evaporator that evaporates the condensed refrigerant and also performs heat exchange between this refrigerant and the heat transfer medium, and an expansion valve that allows liquid-phase refrigerant retained in the condenser to expand, the heat transfer medium flow rate estimating device comprising:
a refrigerant-flow-rate calculating portion that calculates a heat quantity exchanged between the refrigerant and the heat transfer medium at the evaporator based on a planned value of the flow rate of the heat transfer medium and a measured value of the temperature of the heat transfer medium flowing in the evaporator, and that calculates the flow rate of the refrigerant flowing in the evaporator from the heat quantity; and
a heat-transfer-medium-flow-rate back-calculating portion that back-calculates the flow rate of the refrigerant flowing in the evaporator based on the flow rate of the refrigerant calculated by the refrigerant-flow-rate calculating portion and a ratio between a set value of the differential pressure between the condenser and the evaporator and a measured value of the differential pressure, that back-calculates a heat quantity exchanged between the refrigerant and the heat transfer medium at the evaporator from the back-calculated flow rate of the refrigerant, and that back-calculates the flow rate of the heat transfer medium based on the back-calculated heat quantity and the measured value of the temperature of the heat transfer medium flowing in the evaporator,
wherein updating processing for updating a planned value of the flow rate of the heat transfer medium is performed based on the flow rate of the heat transfer medium that is back-calculated by the heat-transfer-medium-flow-rate back-calculating portion; the flow rate of the refrigerant is calculated by the refrigerant-flow-rate calculating portion based on an updated planned value; and the degree-of-opening of the expansion valve is controlled in accordance with the calculated flow rate of the refrigerant.

2. A heat-source unit according to claim 1, wherein, in the updating processing, the planned value of the flow rate of the heat transfer medium is updated so as to be at an internal division point between the planned value of the flow rate of the heat transfer medium and the flow rate of the heat transfer medium that is back-calculated by the heat-transfer-medium-flow-rate back-calculating portion.

3. A heat-source unit according to claim 1, wherein the updating processing is performed when a state of deviation between the planned value of the flow rate of the heat transfer medium and the flow rate of the heat transfer medium that is back-calculated by the heat-transfer-medium-flow-rate back-calculating portion matches a state of a phenomenon occurring in the unit.

4. A heat-source unit according to claim 1, wherein the updating processing is performed when a difference between a motor power input of the compressor determined from a theoretical value of the coefficient of performance of the heat-source unit and a measured value of the motor power input of the compressor is equal to or greater than a predetermined value.

5. A heat-source unit according to claim 1, wherein the updating processing is performed when a difference between a heat-transfer-medium load and a load determined from a current flowing in a motor that drives the compressor is equal to or greater than a predetermined value.

6. A heat-source unit according to claim 1, wherein the updating processing is performed when a difference between a temperature at which the heat transfer medium flows out of the evaporator and a saturation temperature inside the evaporator or a difference between a temperature at which the heat-source medium flows out of the condenser and a saturation temperature inside the condenser does not fall within a predetermined range.

* * * * *